United States Patent [19]

Bergstrom

[11] Patent Number: 5,079,905
[45] Date of Patent: Jan. 14, 1992

[54] FLOATING WEED RAKE

[76] Inventor: Thomas A. Bergstrom, 2162 Mounds Ave. NW., New Brighton, Minn. 55112

[21] Appl. No.: 529,611
[22] Filed: May 29, 1990
[51] Int. Cl.⁵ .......................... A01D 7/02; A01D 44/00
[52] U.S. Cl. .................................... 56/8; 56/400.01; 294/66.1
[58] Field of Search ................ 294/19.1, 19.2, 26, 294/55, 66.1; 15/1.7; 37/54, 55, 119-121, 135; 43/1, 4; 56/8, 400.01, 400.04, 400.05, 400.07, 400.11, 400.12, 400.19; 172/378; 441/80-83, 136

[56] References Cited

U.S. PATENT DOCUMENTS

| 782,067 | 2/1905 | Shelby et al. | 294/66.1 X |
|---|---|---|---|
| 1,703,402 | 2/1929 | Matsuoka | 56/8 |
| 2,551,998 | 5/1951 | De Groot | 294/66.1 |
| 2,649,327 | 8/1953 | Fortin et al. | 294/66.1 |
| 2,693,161 | 11/1954 | Stubbs | 56/8 X |
| 2,961,817 | 11/1960 | Mitchell | 56/8 |
| 4,768,331 | 9/1988 | Jones | 56/8 |
| 4,852,337 | 8/1989 | Peterson | 56/8 |
| 4,999,982 | 3/1991 | Kriger | 294/66.1 X |

FOREIGN PATENT DOCUMENTS

| 801010 | 7/1936 | France | 294/66.1 |
|---|---|---|---|
| 974270 | 2/1951 | France | 56/400.01 |
| 232841 | 9/1944 | Switzerland | 56/400.19 |
| 12005 | of 1903 | United Kingdom | 56/400.19 |

Primary Examiner—Johnny D. Cherry

[57] ABSTRACT

A plastic tube serving as a rake head has teeth disposed along its undersurface and a pair of spaced-apart aluminum tubes. The plastic tube is injected with buoyant filler material to make the rake floatable. A rope is secured to the outer end of one aluminum tube, extends to form a loop, and is secured at its other end to the outer and second of the aluminum tube. An inner handle bar is slidably disposed between the looped rope outward of the aluminum tubes, and an outer handle is disposed at the end of the loop, allowing the user to retrieve weeds from water by first using the outer handle bar, and to remove the weeds by using the inner handle bar.

5 Claims, 1 Drawing Sheet

FLOATING WEED RAKE

BACKGROUND OF THE INVENTION

This invention relates to rakes for removing weeds from bodies of water, and, more particularly, to a floating weed rake for shore or dock retrieval and removal of surface weeds from lakes, streams, ponds and the like.

Weed removal from recreational bodies of water, such as vacation lakes and streams, is presently accomplished on a large scale using harvesting machinery. Such equipment is expensive and unsuitable for numerous smaller problem areas. The use of chemicals for destroying weeds has often been unsatisfactory because of cost, as well as environmental considerations. Individuals faced with weed problems have also resorted to the use of lawn rakes, pitchforks and other equipment related thereto, which is not designed for the specific task of weed removal from water. Attempts have been made to modify the standard lawn rake to make it adaptable for use in water, with varying degrees of success.

The floating rake of this invention permits an individual standing on a shore or dock to throw the rake out onto the lake or stream and pull the weeds to the shore or dock, and, using the same device, pull the weeds from the water. The user does not have to enter the water, although the user may wade into the water if desired. Both retrieval and removal of the weeds from the water can be easily and quickly accomplished.

SUMMARY OF THE INVENTION

In accordance with this invention, there is provided a floating weed rake having an elongated, buoyant member with sufficient rigidity to function as the rake head, and having a number of teeth or tines secured to its undersurface. A pair of parallely spaced-apart arm members are secured to the elongated member, such arms extending horizontally from the elongated member. A flexible cord is secured at one end to one of the arm members and loops back and is secured to the outer end of the other arm member, the cord having sufficient length such that the end of the loop extends substantially away from the elongated member. The cord also has a handle bar disposed outwardly from the ends of the arm members, the handle bar being slidably disposed thereon. A user standing on shore, can first throw the rake out into the water and then, using the outer end of the loop, retrieve weeds from the water. Once the weeds have been pulled closer to shore, the user grabs the handle bar adjacent to the outer ends of the arm members and can thereby remove the weeds from the water.

It is a primary object of this invention to provide a floating rake for quickly and easily removing surface weeds from lakes, streams, ponds and the like, from shore or from a dock.

It is another object of this invention to provide an inexpensive, lightweight floating rake for removing weeds from lakes, and one that can be used by a single person, without aid from others or the use of a boat or other equipment.

It is a further object of this invention to provide a floating rake having a minimum of moving parts and yet which allows efficient weed removal, and is easily carried, stored and maintained.

DESCRIPTION OF PREFERRED EMBODIMENT

Figure 1:
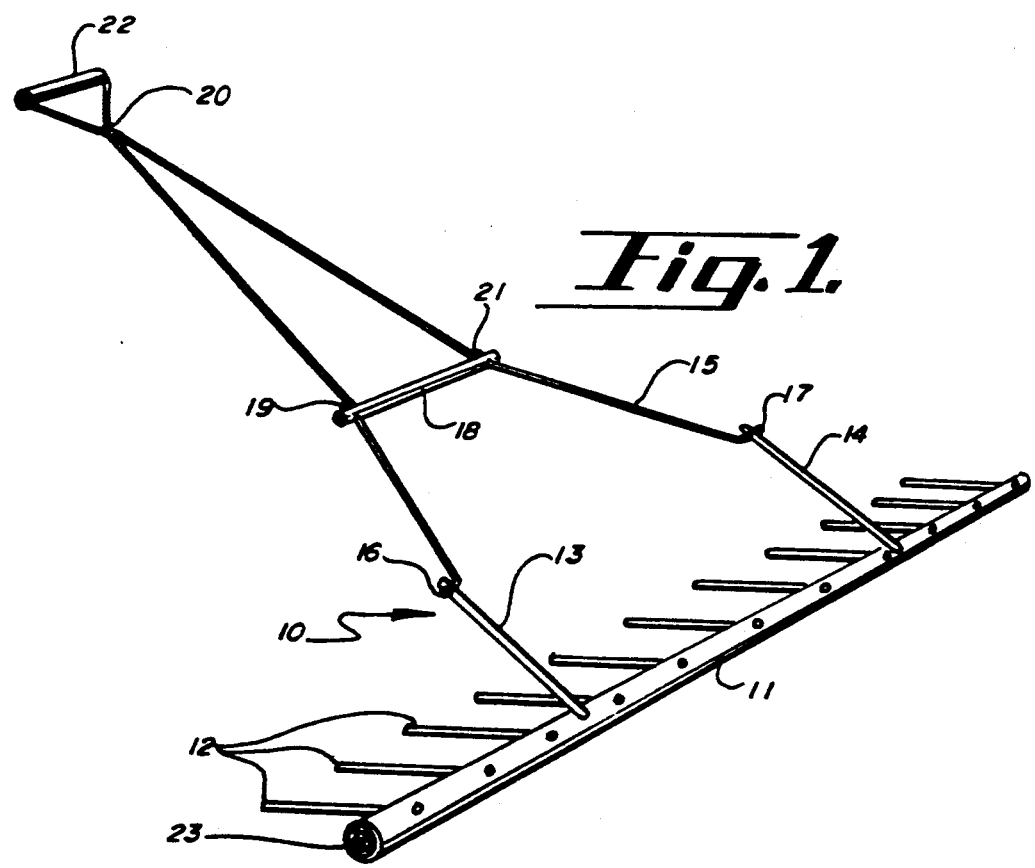
FIG. 1 is a perspective view of the weed rake of this invention.

Referring more specifically to the drawings, FIG. 1 shows a floating weed rake 10, having elongated head 11, a plurality of teeth 12, arranged substantially in a row across the underside of the elongated head 11, and a pair of aluminum arms 13, 14, secured to the elongated head 11 at an angle of less than 90 degrees with the row of teeth 12. A flexible cord 15 is attached at one end 16 to an outer end of one of the aluminum arms 13 and extends outwardly from the elongated head 11 and loops back to where it is attached at its other end 17 to the opposite aluminum arm 14. Disposed across the flexible cord 15 adjacent to the outer ends of aluminum arms 13, 14 is an inner handle bar 18, having holes at either end through which cord 15 can slide. Outward from the inner handle bar 18, the flexible cord 15 is knotted at points 19, 21. At the furthermost end of the loop of cord 15 is disposed an outer handle bar 22, through the hollow interior of which passes cord 15. Knot 20 just below handle 22 will keep it properly positioned.

Elongated rake head 11 can be constructed of a hollow plastic tube injected with a buoyant filler material 23 within the hollow portions thereof. The buoyant filler material can be an injectable foam or any such product capable of being inexpensively introduced within the plastic tube making up elongated head 11. Teeth 12, spaced apart along the underside of head 11 can be plastic spikes forced fit through holes in the plastic tube of the rake head 11 following injection of the buoyant filler material, 23. Similarly, the aluminum arms 13, 14 can be secured to the rake head 11 by inserting them through holes in the plastic sheathing following injection of the filler material 23 and securing with cotter pins or similar hardware. Inner and outer handle bars 18, 22, can be formed of plastic as well. Flexible cord 15 can be made of any of the natural material ropes used for marine purposes, but is formed most advantageously of plastic, such as polypropylene used in sailboat ropes.

The use of plastic for all of the components of the weed rake except for the aluminum arms 13, 14 is not required, but works most efficiently to provide both rigidity of structure and buoyancy of the rake when placed in the water. That is, other materials may be used as to the described components, as long as the resulting rake is both rigid enough to serve its raking function, and also can float on the water surface so as to be able to gather in weeds as it is pulled to shore. Furthermore, the weed rake must be light enough so that it can be thrown out onto the water surface, as will be described below.

Figure 2:
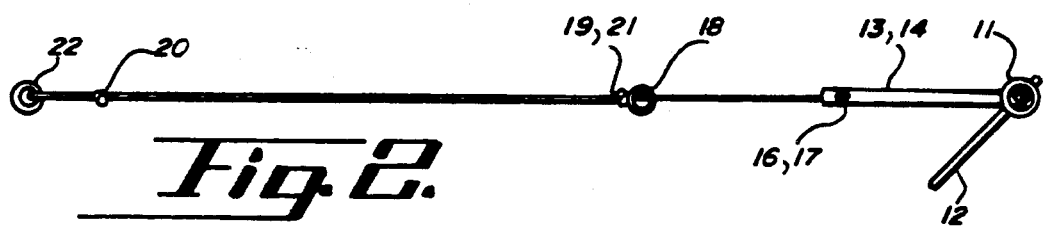
FIG. 2 is a side view of the weed rake.

FIG. 2 more clearly illustrates the less than 90 degree angle between the teeth 12 of the rake head 11 and the aluminum arms 13, 14. This less than 90 degree angle of weed gathering allows the surface weeds to be most easily pulled to shore or a dock by a single person, without the need for a boat or other equipment.

In using the floating weed rake 10, the user first grasps the elongated head 11, preferably in the middle by one or two hands, and tosses it a few yards out into the body of water, at the same time holding onto the outer handle bar 22. Given a sufficient length of cord 15, the user can propel the rake 10 out to a distance of approximately 15-20 feet, using an easy pushing motion. The elongated rake head 11 can then be properly positioned in the water, with the head 11 floating on the surface thereof, by the user pulling on either one or the other of the loop portions. The slidability of cord 15 within the holes of inner handle bar 18 facilitates this steering action; that is, the force of pulling on one loop portion will be transmitted to the respective aluminum arm 13 or 14, causing the rake head 11 to move one way or the other, as desired.

Figure 3:
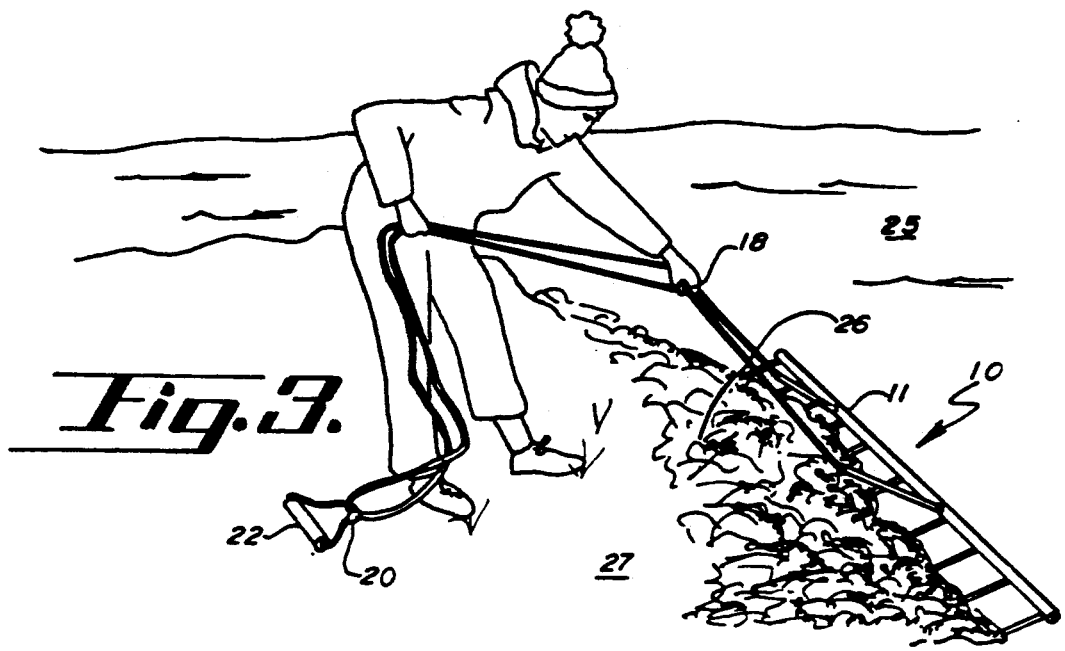
FIG. 3 is a side perspective view showing use of the rake in removal of weeds from water.

As shown in FIG. 3, after the user has thrown the rake 10 out on the water 25 and used the handle bar 22 to pull the weeds 26 to the shore position, as indicated, the user then can grab the inner handle bar 18. Thus, the outer handle bar 22 is used to retrieve weeds as far out as approximately 15-20 feet, after which it can be dropped to the ground, as indicated. The user can then remove the weeds from the water by pulling the rake head upwardly and into shore, using handle bar 18, as shown. Although the user in FIG. 3 is shown standing on shore, 27, such user can also wade into the water with the rake 10 if desired. The rake can also be used from a dock, as to both the retrieval and removal operations.

The lightweight construction of the floating rake 10 allows it not only to be easily cast out onto a body of water, as shown, but also permits it to be easily carried from storage to the water area to be raked. The simple yet smoothly functioning structure, having only the sliding handle bar 18 as a moving part, makes for consistent functioning and low maintenance. Similarly, the use of plastic permits the rakes to be provided to the ultimate user at relatively low prices, in comparison to harvesting machinery and the like in current use. In sum, the floating weed rake will be readily available to the private lakeshore property owner, as well as the resort owner, and each will be able to quickly make use of it.

It is claimed:

1. A floating weed rake having a head and comprising:

an elongated, buoyant member having sufficient rigidity and buoyancy to function as the head of the rake, with the elongated member on the surface of a body of water, a plurality of teeth secured to the undersurface of the elongated member, and being substantially in alignment, a pair of parallely spaced-apart arm members secured to the elongated member and extending substantially horizontally from the elongated member, a flexible cord secured at one end to an outer end of one arm member, the cord forming a cord loop with an outer portion and looping back and being secured to the outer end of the other arm member, the cord having sufficient length such that the outer portion of the loop extends substantially away from the elongated member, and a handle bar slidably disposed outwardly from the ends of the arms members, across the cord loop at its outer portion, such that a user standing on shore adjacent to a body of water can pull the handle bar to retrieve surface weeds and remove then from the water.

2. The floating weed rake of claim 1 wherein the handlebar comprises a hollow plastic tube through which the flexible cord can slide at the outer portion of the cord loop.

3. The floating weed rake of claim 1 wherein the teeth disposed on the elongated member form an angle of less than 90 degrees with the arm members.

4. The floating weed rake of claim 1 wherein the elongated member comprises a plastic tube injected with buoyant filler material.

5. A floating weed rake having a head and comprising:

a plastic tube injected with buoyant filler material and serving as the rake head, a pair of aluminum tubes, parallely spaced-apart, each secured at an inner end to the plastic tube and extending horizontally therefrom, a plurality of plastic teeth secured in substantial alignment across the undersurface of the plastic tube, and at an angle of less than 90 degrees to the aluminum tubes, a rope secured at one end to the outer end of one aluminum tube, forming a loop with an outer portion, running substantially away from the plastic tube and looping back thereto and being secured to the outer end of the other aluminum tube, an inner handle bar having holes at its ends through which the rope passes, the inner handle bar being thereby slidably disposed across the looped rope adjacent to the outer ends of the aluminum tubes, the rope being knotted outward of the inner handle bar position on the looped rope to restrain the inner handle bar in position during removal of weeds, and an outer handle bar having a hollow interior through which the rope passes at its outer portion, such that the user can retrieve weeds by first using the outer handle bar, and can then remove weeds using the inner handle bar.

* * * * *